US011531916B2

United States Patent
Kumar et al.

(10) Patent No.: US 11,531,916 B2
(45) Date of Patent: Dec. 20, 2022

(54) SYSTEM AND METHOD FOR OBTAINING RECOMMENDATIONS USING SCALABLE CROSS-DOMAIN COLLABORATIVE FILTERING

(71) Applicant: PAYPAL, INC., San Jose, CA (US)

(72) Inventors: Dinesh Kumar, Santa Clara, CA (US); Yuanyuan Pan, Fremont, CA (US); Prashant Gaurav, Fremont, CA (US); Fransisco Kurniadi, Dublin, CA (US); Kevin Ward, Sacramento, CA (US); Yue Xin, San Jose, CA (US); Krishnakumar Govindarajalu, San Jose, CA (US); Kimberly Kidney, Salem, MA (US); Tao Sun, Union City, CA (US)

(73) Assignee: PayPal, Inc., San Jose, CA (US)

( * ) Notice: Subject to any disclaimer, the term of this patent is extended or adjusted under 35 U.S.C. 154(b) by 953 days.

(21) Appl. No.: 16/213,346

(22) Filed: Dec. 7, 2018

(65) Prior Publication Data

US 2020/0184357 A1 Jun. 11, 2020

(51) Int. Cl.
*G06N 5/04* (2006.01)
*G06N 20/20* (2019.01)

(52) U.S. Cl.
CPC .............. *G06N 5/048* (2013.01); *G06N 20/20* (2019.01)

(58) Field of Classification Search
CPC .......... G06N 5/048; G06N 20/20; G06N 5/04; G06N 7/005; G06Q 30/0201; G06Q 30/0279; G06Q 30/0282; G06Q 30/06; G06Q 50/01; G06Q 50/22

USPC ........................................................ 706/11
See application file for complete search history.

(56) References Cited

U.S. PATENT DOCUMENTS

| 9,619,831 | B1 | 4/2017 | Kumar et al. |
| 10,326,672 | B2* | 6/2019 | Scheib ................ G06F 9/45558 |
| 10,402,726 | B1* | 9/2019 | Moore ................ G06F 3/04842 |
| 10,469,504 | B1* | 11/2019 | Dandekar ............. H04L 63/102 |
| 10,962,437 | B1* | 3/2021 | Nottrott ............ G01N 21/3504 |
| 11,126,630 | B2* | 9/2021 | Kulkarni ............... G06F 16/248 |
| 2005/0193002 | A1 | 9/2005 | Souders et al. |
| 2007/0255653 | A1 | 11/2007 | Tumminaro et al. |
| 2009/0006290 | A1 | 1/2009 | Gunawardana et al. |

(Continued)

OTHER PUBLICATIONS

Tiroshi et al.—"Graph Based Recommendations: From Data Representation to Feature Extraction and Application"—2017—https://arxiv.org/pdf/1707.01250.pdf (Year: 2017).*

(Continued)

*Primary Examiner* — Viker A Lamardo
(74) *Attorney, Agent, or Firm* — Haynes and Boone, LLP

(57) ABSTRACT

Aspects of the present disclosure involve systems, methods, devices, and the like for presenting a recommendation. In one embodiment, a system is introduced that includes a plurality of models for obtaining a recommendation score. The recommendation score may be obtained using one or more models which can include supervised and unsupervised learning as well as a combination of user information and transactions. In another embodiment, the system is introduced that can provide a total recommendation score and recommendation generated by an ensemble model whose input can include the one or more recommendation scores previously obtained.

20 Claims, 7 Drawing Sheets

(56) References Cited

U.S. PATENT DOCUMENTS

| | | | |
|---|---|---|---|
| 2009/0013002 A1 | 1/2009 | Eggink et al. | |
| 2009/0119265 A1* | 5/2009 | Chou | G06F 16/48 709/204 |
| 2011/0251868 A1 | 10/2011 | Mikurak | |
| 2013/0097664 A1* | 4/2013 | Herz | G06F 16/337 726/1 |
| 2015/0188941 A1* | 7/2015 | Boshmaf | H04L 63/1441 726/22 |
| 2016/0005070 A1 | 1/2016 | Burr et al. | |
| 2016/0300144 A1 | 10/2016 | Santhanam et al. | |
| 2017/0177596 A1 | 6/2017 | Comstock et al. | |
| 2017/0250930 A1 | 8/2017 | Ben-Itzhak | |
| 2018/0124020 A1* | 5/2018 | Rodriguez | H04L 63/1441 |
| 2018/0174212 A1 | 6/2018 | Lauka et al. | |
| 2018/0342004 A1 | 11/2018 | Yom-Tov et al. | |
| 2019/0066186 A1* | 2/2019 | Singh | G06N 20/00 |
| 2019/0171187 A1* | 6/2019 | Celia | G06N 20/00 |
| 2019/0213226 A1 | 7/2019 | Ludwinski et al. | |
| 2020/0134696 A1 | 4/2020 | Lardeux et al. | |
| 2020/0160229 A1 | 5/2020 | Atcheson | |

OTHER PUBLICATIONS

Demissie S., et al., "A Clustering-Based Context-Aware Recommender Systems Through Extraction of Latent Preferences," International Journal of Advanced Research in Computer Science, 9(2), 9 pages.

International Appl. No. PCT/US2019/064328, International Search Report and Written Opinion dated Feb. 14, 2020, 17 pages.

Sahebi, Shaghayegh, Brusilovsky, Peter, Bobrokov, Vladimir, "Cross-Domain Recommendation for Large-Scale Data"; Proceedings of RecSysKTL Workshop @ ACM ReeSys '17, Aug. 27, 2017, Como, Italy, 7 pages.

Extended Search Report issued for European Patent Application No. 19895759, dated Jul. 18, 2022, 9 pages.

* cited by examiner

SYSTEM AND METHOD FOR OBTAINING RECOMMENDATIONS USING SCALABLE CROSS-DOMAIN COLLABORATIVE FILTERING

TECHNICAL FIELD

The present disclosure generally relates to communication devices for generating recommendations, and more specifically, to communication devices that provide user specific recommendations using cross-domain collaborative filtering.

BACKGROUND

In the advent of technology, industry has moved to the use of electronic devices and communications for processing transactions. The transactions can generally begin with a consumer submitting a funding instrument for payment and continues to a vendor for authorization of such transaction. In some instances, a recommendation may be provided to a consumer prior to completing such transaction, based in part on a popular item or trend. For example, at checkout, a user may be provided with a recommendation to donate to a popular cause or charity. However, this type of recommendation, is oftentimes not tailored to a user's interests, likes, purchases, and/or associations. Therefore, in an effort to increase the chance of a user purchase or donation, it would be beneficial to create a system that provides recommendations that are tailored to a user and across domains.

Figure 1:
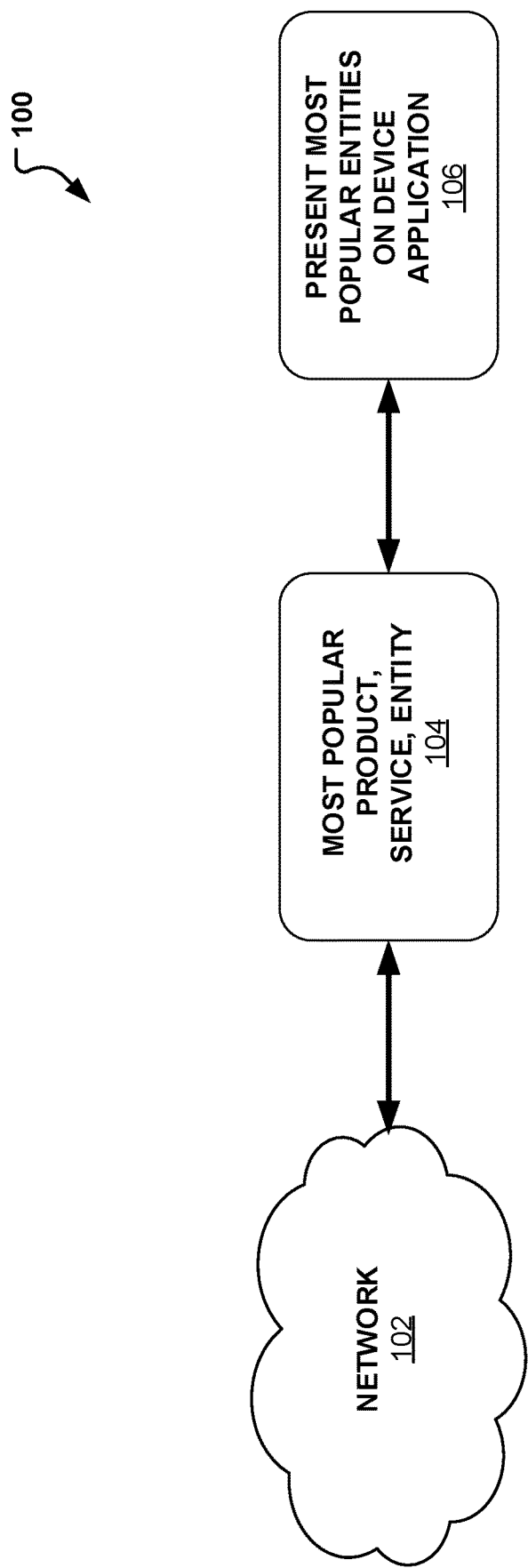
FIG. 1 illustrates systems for presenting a recommendation on a user device.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for presenting a recommendation. In one embodiment, a system is introduced that includes a plurality of models for obtaining a recommendation score. The recommendation score may be obtained using one or more models which can include supervised and unsupervised learning as well as a combination of user information and transactions. In another embodiment, the system is introduced that can provide a total recommendation score and recommendation generated by an ensemble model whose input can include the one or more recommendation scores previously obtained.

Conventionally, to increase customer's engagement, merchants, third-party service providers, and other entities that provide a product or service, may rely on a recommendation of a product or service based on popularity. The engagement is easy to implement, and the product and/or service may be easily presented and considered for purchase. For example, consider FIG. 1 which illustrates a basic system and method for presenting a recommendation to user. As illustrated, a recommendation may derive from a network 102. The network 102 can include any two computers, servers, or other system/device which can be linked together in order to share resources and exchange electronic information. The internet, the cloud, a group of servers, a data center, social media may all be considered part of a network 102. This network may be access and used for determining a most popular item, product, service, or entity to recommend. For example, social media may be scraped, and the data obtained analyzed to determine that a new smart gadget has been released and is trending. Such smart gadget may therefore be presented to a user on a device 106. As another example, a natural disaster may have occurred recently and as a result of the media coverage a popular entity providing relief effort may be presented to the user for donation. Still further, in looking for a charity to contribute to, the YMCA, United Way, Red Cross, etc. may be presented based on knowledge and popularity. These examples, however, fail to neglect a customer's behaviors and/or products, services, entities, etc., which may be smaller or in lower demand.

It is therefore beneficial to have a system which can consider various aspects of a user before making a recommendation. For example, consider a recommendation to a charitable cause. Using the simplified method and system 100 presented in FIG. 1, smaller charities will be neglected, and customer's behaviors omitted. Alternatively, by associating purchase behaviors with donations (using collaborative filtering), recommendations may be more customized and relevant to a user.

Note that throughout this application the recommendations and analysis will be generally focused on charities, however, the application is not limited to caused based recommendations and as indicated above, the method and system presented herein may be used for providing recommendations for other products, services, entities and the like.

Figure 2:
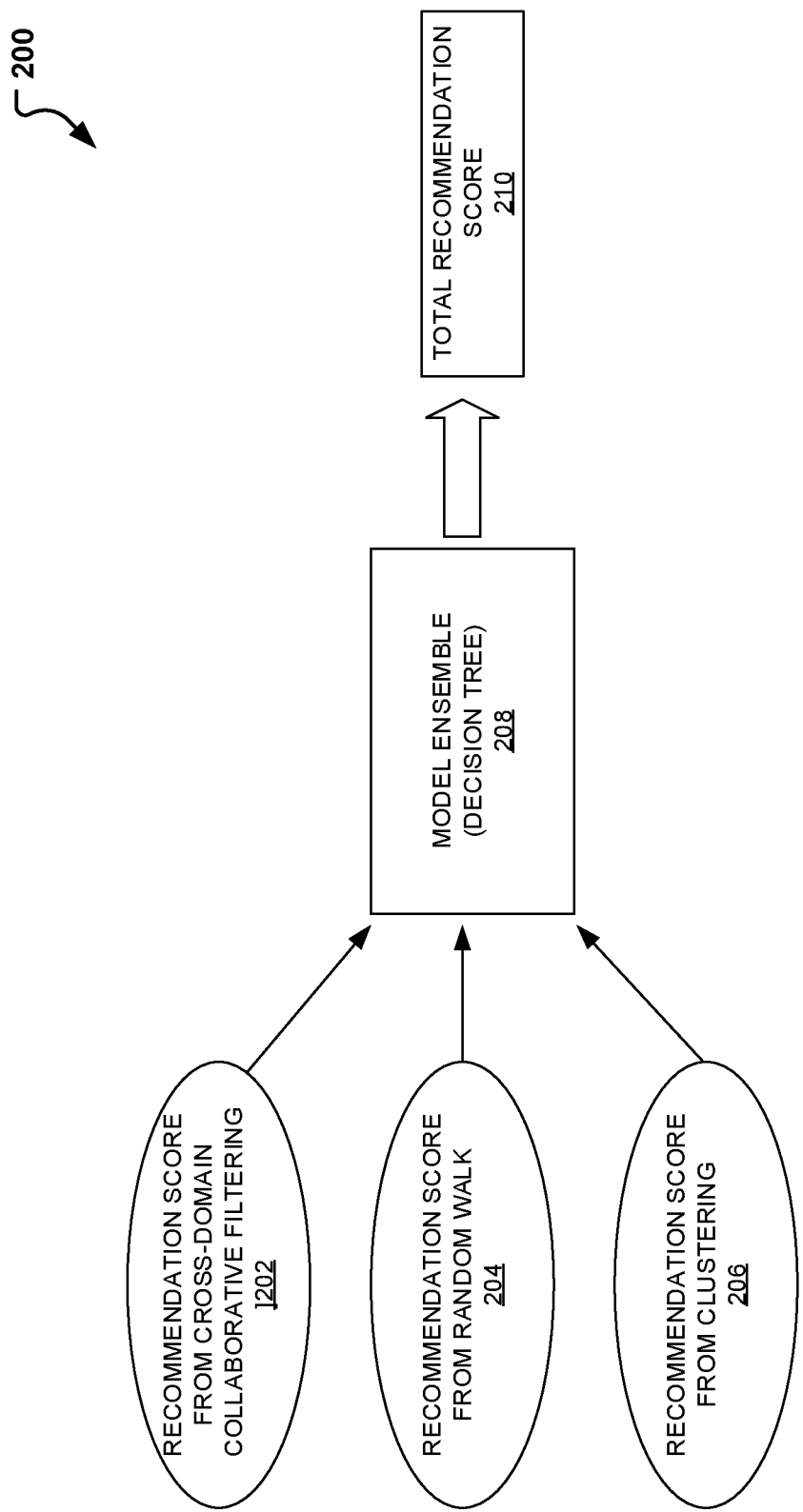
FIG. 2 illustrates a diagram of the implementation of cross-domain collaborative filtering for making recommendations.

Turning to FIG. 2, a more customizable approach for making recommendations is illustrated. In particular, FIG. 2 illustrates a diagram of the implementation of cross-domain collaborative filtering 200 for making recommendations. As illustrated in FIG. 2, the recommendation presented is based on a total recommendation score 210 computed and obtained using an ensemble model 208. An ensemble model 208 is a modeling technique or process which uses two or more analytical models to obtain a final result or recommendation. The final result or recommendation 210 may be obtained by combining a prediction made by each of the models in order to obtain or generate a more accurate final result. Alternatively, the ensemble model 208 may obtain the final result by selecting and using the one or more models which create a best model for the problem considered. For example, in the charity example considered, the ensemble model 208 may obtain a recommendation for one or more best charities by obtaining separate recommendation scores from each of a plurality of models.

In one embodiment, in order to obtain a more customized recommendation of a charity, three distinct models 202-206 are presented. In a first model, a recommendation score may be obtained using a model that entails cross-domain collaborative filtering 202. A second model, may include the use of random walk technique for determining a recommendation score 204. While the third model, may include the use of clustering for determining the recommendation score 206.

The first model, which includes the use of cross-collaborative filtering 202 is a model designed to consider not only a user and his/her transactions but consider transactions across domains. For example, transactional information about a merchant and a charity are considered. Thus, one focus of the cross-collaborative filtering model 202 may include making a recommendation based in part on an association or prediction regarding people who made a purchase with a particular merchant and also donated to a particular charity. In other words, the system is designed to show that users who make purchases at a particular merchant are also likely to make a donation to a specific cause. To illustrate this, consider a user who ordered online pet food at merchant X, then given that the user purchased pet food at merchant X, there is a likelihood that the user will donate to the Friends of Animals charity. Thus, a user is presented with a customized charity as opposed to a random or most popular one which may have little or no association with the user and his/her behaviors. Specific details on how the cross-domain model 202 are described below and in conjunction with FIG. 4.

Figure 3:
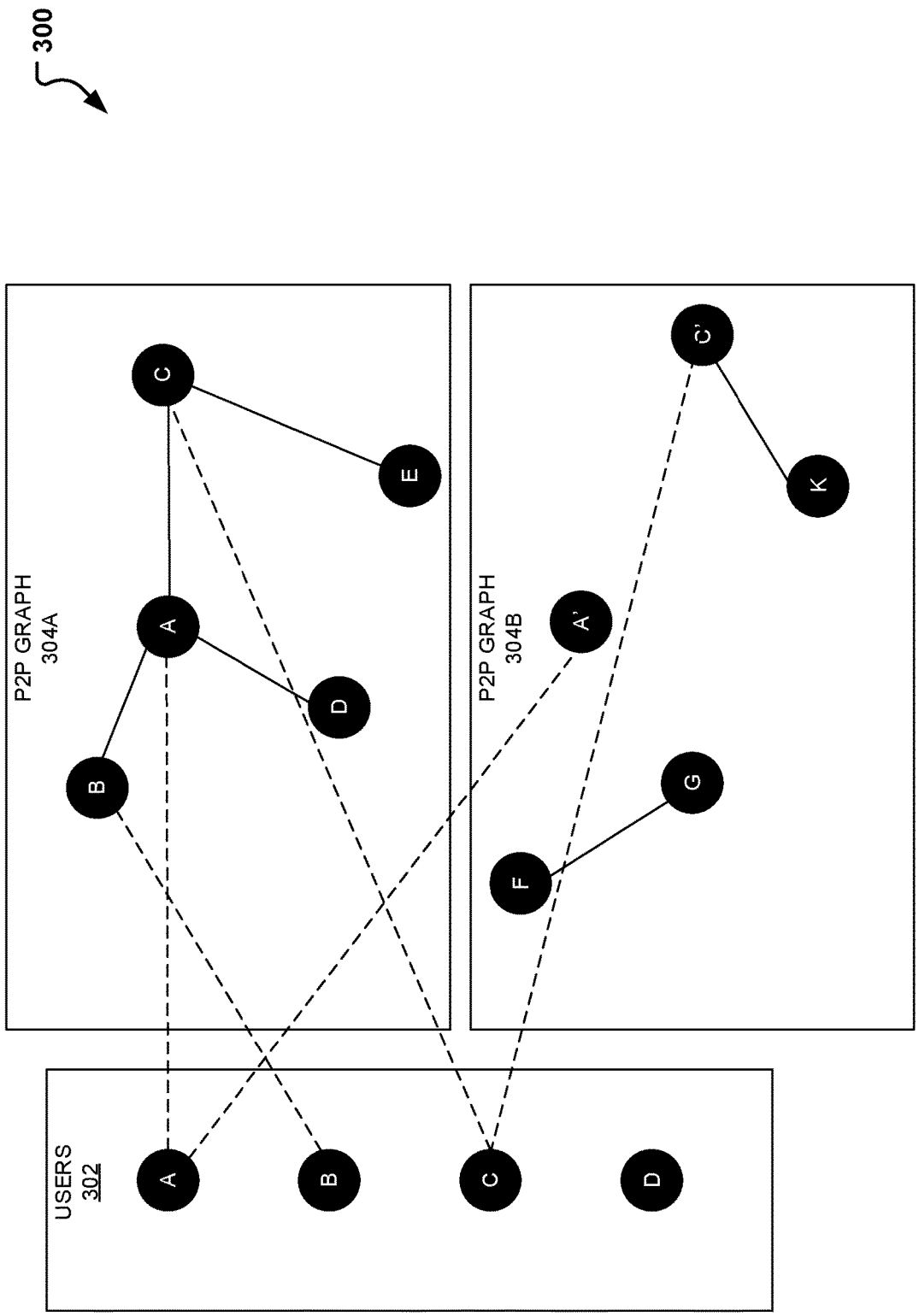
FIG. 3 illustrates a subgraph node representation with users and corresponding peer-to-peer associations used to obtain a recommendation score.

The random walk model 204 is a model that is focused more on transactions and peers associated with a user. For example, consider a user associated with a third-party provider like PayPal. This user may also have separate accounts with Venmo and Xoom (two entities associated with PayPal). Thus, the random walk model 204, may use knowledge of the user's transactions with PayPal as well as those with Venmo and Xoom. Additionally, the random walk model 204, may also use information regarding who the transactions or what peers the user transacted with. Thus, the random walk model can be generated using a mathematical path that can be generated between transactions across entities and/or with other peers. An illustration of such graph is detailed and described in conjunction with FIG. 3. Note that although the Venmo and Xoom are use here, other transactions between merchants, using digital instruments, and between peers may be contemplated. FIG. 3 is used for exemplary purposes and is used to illustrate how a recommendation may be presented to a user (or fed into an ensemble model 210) based in part on the user's transactions and personal associations including but not limited to contacts, friends, family, organizations, co-workers, etc.

Next, a cluster model 206 may be used for the determination of a recommendation score. The cluster model 206 uses a technique based on grouping objects or dividing a population based on similarities. For example, provided the users are members of a third-party payment provider service (e.g., PayPal) the users may be clustered based on profile data. Thus, in the charity example, a user may be presented with a customized charity or provided a recommendation score based on the cluster the user falls in. The users may therefore be classified into one of n clusters based on a profile data which can include information including but not limited to gender, address, age, marital status, etc. Thus, the focus in using the cluster model 206 may be to present recommendations based on the profile information. For example, all users may be classified into N clusters based on gender and age. In such example, the clustering may result in a number of clusters including but not limited to (male, age <20), (male, 20> age <30), (female, age <20), (female, 20> age <30). Thus, if a user belongs to the cluster (male, 20> age <30), then the most popular charity in the cluster will be recommended to that user.

To determine how to obtain a recommendation or a recommendation score, a score for every charity for each user may be calculated and represented by $$\text{Score} = P\left(\frac{\sum \text{transactions to charity } d \text{ in the cluster}}{\sum \text{total charity transactions in the cluster}}\right)$$

the probability of the charity in the user's cluster.

Therefore, turning to FIG. 2, once the models 202-206 have the corresponding recommendation score, the ensemble model 208 may be used to obtain the total recommendation score 210. In one embodiment, the ensemble model 208 can include a decision tree model. A decision tree model is a tree-like graph that is created based on the possible decisions and outcomes possible. As such, using at least some of the recommendation scores, the P2P data, user profile data, and cross-domain information, a decision tree may be created and used to provide a charity recommendation score. As an example, consider Table 1 below, wherein a charity score may be generated based on a merchant's information and P2P transaction information. The ensemble model may be trained for a subset of users and then used for obtaining the recommendations.

| Customer Id | Charity score, S1 (Venmo P2P) | Charity score, S2 (Xoom P2P) | Charity score, S3 (PayPal P2P) | Charity score, S4 (Clustering) | Charity score (Merchant collaborative filtering), S5 | Charity | Tag (1, if customer did a transaction in the charity during target time period) |
|---|---|---|---|---|---|---|---|
| C1 | 0.2 | 0.1 | 0.1 | 0.2 | 0.2 | D1 | 1 |
| C1 | 0.3 | 0.3 | 0.1 | 0.1 | 0.7 | D2 | 0 |
| C1 | 0.3 | 0.5 | 0.5 | 0.3 | 0.3 | D3 | 0 |
| C2 | 0.5 | 0.4 | 0.2 | 0.6 | 0.5 | D1 | 0 |

| Customer Id | Charity score, S1 (Venmo P2P) | Charity score, S2 (Xoom P2P) | Charity score, S3 (PayPal P2P) | Charity score, S4 (Clustering) | Charity score (Merchant collaborative filtering), S5 | Charity | Tag (1, if customer did a transaction in the charity during target time period) |
|---|---|---|---|---|---|---|---|
| C2 | 0.2 | 0.3 | 0.3 | 0.2 | 0.9 | D2 | 1 |

As indicated obtaining a recommendation score is first step in determining what product, service, and in this example, charity to recommend. FIG. 3 illustrates an exemplary subgraph node representation 300 with users 302 and corresponding peer-to-peer associations 304a, b used to obtain a recommendation score. For example, consider a recommendation, where a user's peer-to-peer transactions may be considered to provide a recommendation. In particular, consider an instance where one or more users 302 (using a digital wallet, payment application, merchant site, third party payment provider, or the like) are considered and transactions between the users and across platforms (across other merchant sites, with associating applications like Venmo and/or Xoom, with a bank, etc.) are analyzed for making a recommendation. Using these transactions, it may be determined that there exist correlations between a friends and/or family members and likes. For example, using the subgraph node representation 300, it may be determined that a high correlation exists between friends and donations to similar causes.

Turning to FIG. 3 for example, it can be seen that user B (on a payment application, e.g., PayPal) transacted using P2P application (e.g., Venmo) and with user A, C, and D. Similarly, user D has participated in P2P transactions however, mostly across applications as illustrated in P2P graphs 304a, 304b. Thus, subgraph node representation 300 can be created by leveraging the social network data and mapping users and identification information using (fuzzy) logic. Then, using each subgraph generated 302 and 304, algorithms such as random walk and other random processes may be implemented to identify and determine correlations.

In one embodiment, a recommendation or recommendation score may be determined using a random walk 204. To illustrate how a random walk algorithm may be used to construct a recommendation, consider an example where a charity is recommended. To make this recommendation, a series of steps may be followed. As a first step, a transition probability matrix (X) may be constructed. To construct the transition probability matrix X, consider a matrix which is a function of the probability of going from node i (at time t) to node j (at time t+1) is represented by $X_{i,j}=P(S_{t+1}=j|S_t=i)$, where $S_t$ is the current state and the $S_{t+1}$ is the next state in the random walk. Each node is also associated with a self-loop.

Next, the transition probability for n steps are calculated. To calculate the steps, consider $X^n = X \cdot X \cdot X \ldots n$ times, where n is a configurable parameter in the algorithm. Because the example considered here is regarding donations, the probability of making a donation is calculated. In this probability, the donation from a node k to a charity $C_d$ is considered and based on a user's 302 transaction history which can be represented as $$P(C_{k,d}) = \frac{\text{No. of donation trasactions by costumer } k \text{ to charity } d}{\text{Total No. of donations trnsactions by costumer } k}$$

where the probability obtains can then be used to compute a recommendation score for every user/customer (node in the subgraph node representation 300, and for each charity. Therefore, a recommendation score may be computed by $$R\_score_{k,d} = \sum_{p=1}^{m} X_{k,p}^n P(C_{p,d}) \forall k, d$$

where d is a charity, k is a customer or user, and m is the number of nodes in the graph. Thus, using this random walk method 204, a first charity recommendation may be provided to a user based in part on the P2P transactions the user has participated in. Note that a similar approach may be taken for other types of recommendations and a charity recommendation score is computed and used for exemplary purposes. A recommendation may similarly be made for places to eat, items to purchase, discounts to provide, etc. Thus, through the construction of a subgraph with nodes use to indicate transactions or interactions, a probability of an action occurring may be computed and thus a recommendation score may be obtained.

In some embodiments, however, a random walk-based recommendation 204 may not be sufficient to meet a desired criterion or may not provide a desirable recommendation (charity). Thus, as indicated above, a cluster-based recommendation score may be computed and used. Still in other embodiments, an even more personal or tailored recommendation may be desirable. As indicated, in those instances, a cross-domain based recommendation score may be more appropriate.

Figure 4:
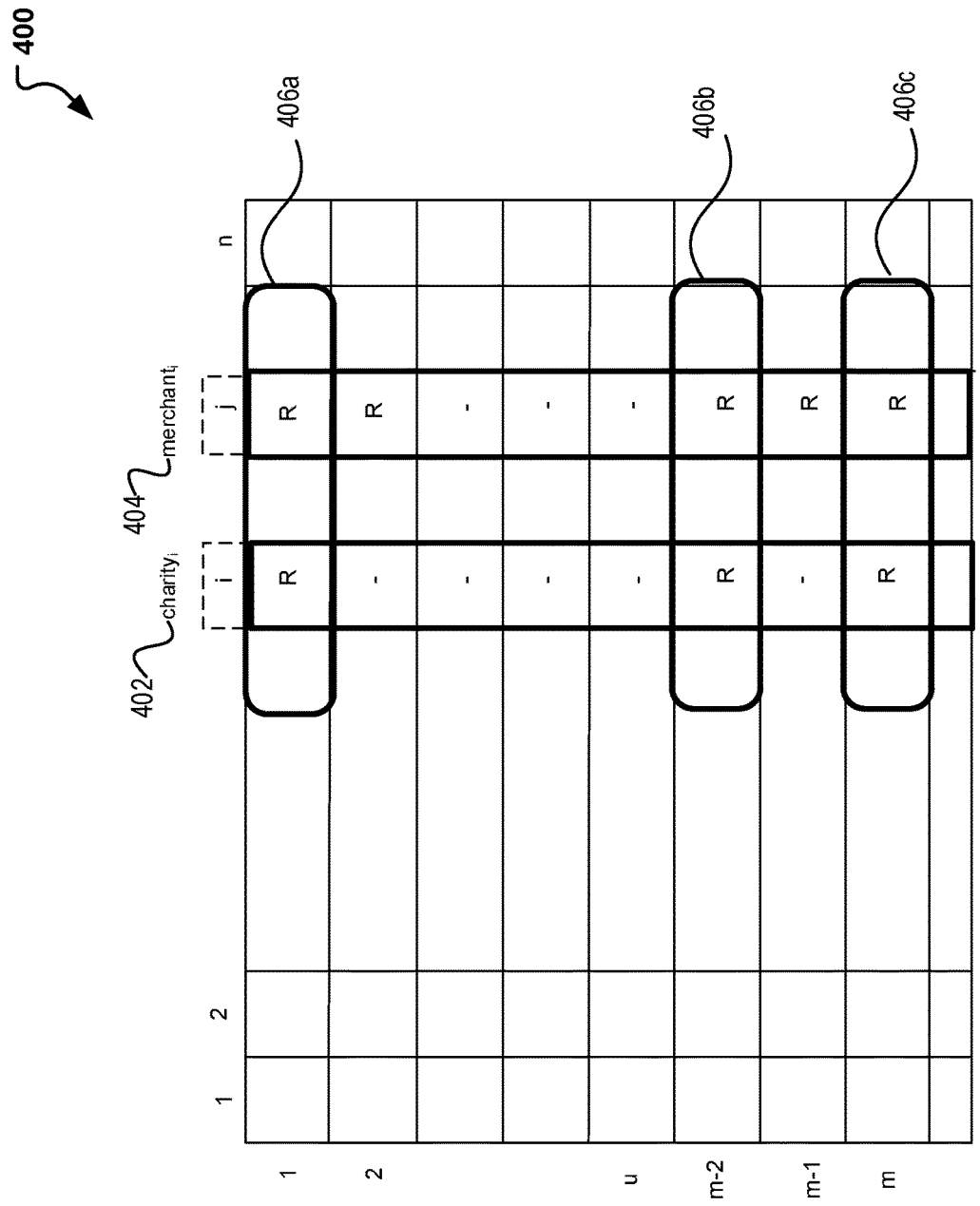
FIG. 4 illustrates table diagram of item-to-item collaborative filtering used to obtain a recommendation score.

To illustrate how a cross-domain based recommendation score may be obtained, FIG. 4 is presented to provide some insight. In particular, FIG. 4 illustrates matrix diagram 400 of item-to-item collaborative filtering used to obtain a recommendation score. In this item-to-item collaborative approach, a cross domain approach is considered where, for example, a merchant and a charity are considered. Therefore, in this ongoing charity example, the recommendation score would be based on a prediction where purchases and contributions are correlated. Thus, prediction may be made that users who purchased with merchant X also donate to charity Y.

Using this approach, a charity-merchant similarity matrix or table diagram 400 is computed illustrating such correlations. Considering matrix diagram 400 or similarity matrix, a first approach is to consider a charity (i) and a merchant (j) and identify those instances where a similarity exists between the two. As illustrated in the similarity matrix, a charity 402 and merchant$_j$ 404 are both examined to determine what similarities exist between the two. For example, as illustrated in matrix diagram 400, both charity 402 and merchant$_j$ 404, share some similarities 406 in rows 1, m−2 and m. From these similarities, a similarity value may be computed and used for determining a recommendation score. In one embodiment, a similarity matrix or matrix diagram 400 may be created based on, for example, co-purchases or other similarity such that $$S_{ij} = J(C_i, M_j) = \frac{|C_i \cap M_j|}{|C_i \cup M_j|}$$

is used as for model training using statistical coefficient measurements such as Jaccard indexing. Alternatively, other measurements and/or indexing mechanisms may be used including but not limited to frequent k characters, hamming distance, correlations, etc. Next, provided the computed index, a prediction may be determined and used in making a recommendation. The prediction may be designed to provide a recommendation to a user. For example, a charity may be determined and recommended to a user. To make the prediction, the weighted sums of the similarity score calculated based on the number of purchases completed by the user with merchants may be used. Therefore, the prediction or recommendation of a given charity maybe provided based on the weighted sum of the similarity score. A charity having the highest score for a user may then be recommended to the user. In one embodiment, the top k charities based on the weighted sum of the similarity score are recommended to the user. Thus, the weighted sum of the similarity score for a user and charity may be calculated based on $$P_{u,i} = \frac{\sum (S_{ij} * R_{ij})}{\sum (R_{ij})}$$

where R denotes the number of transactions of a customer with a merchant or charity and the sum is over the top N user merchants$_j$. Note that the top N user merchants for each user may be selected based on the number of transactions a user may have with each merchant, wherein the execution time of the algorithm may be decrease (significantly) if the computation is restricted to the top N merchants when calculating the weighted score for each charity. Thus, the algorithm is scalable and as such tunable for various values of N.

Recall that once the recommendation score is determined using cross-domain collaborative filtering as discussed and in conjunction with FIG. 4, and/or random walk, and/or clustering, the recommendation score may be further analyzed in order to obtain a total recommendation score. In one embodiment, as described above and in conjunction with FIG. 2, the recommendation scores may be fed into an ensemble model for further processing and total recommendation score 210 determination.

Figure 5:
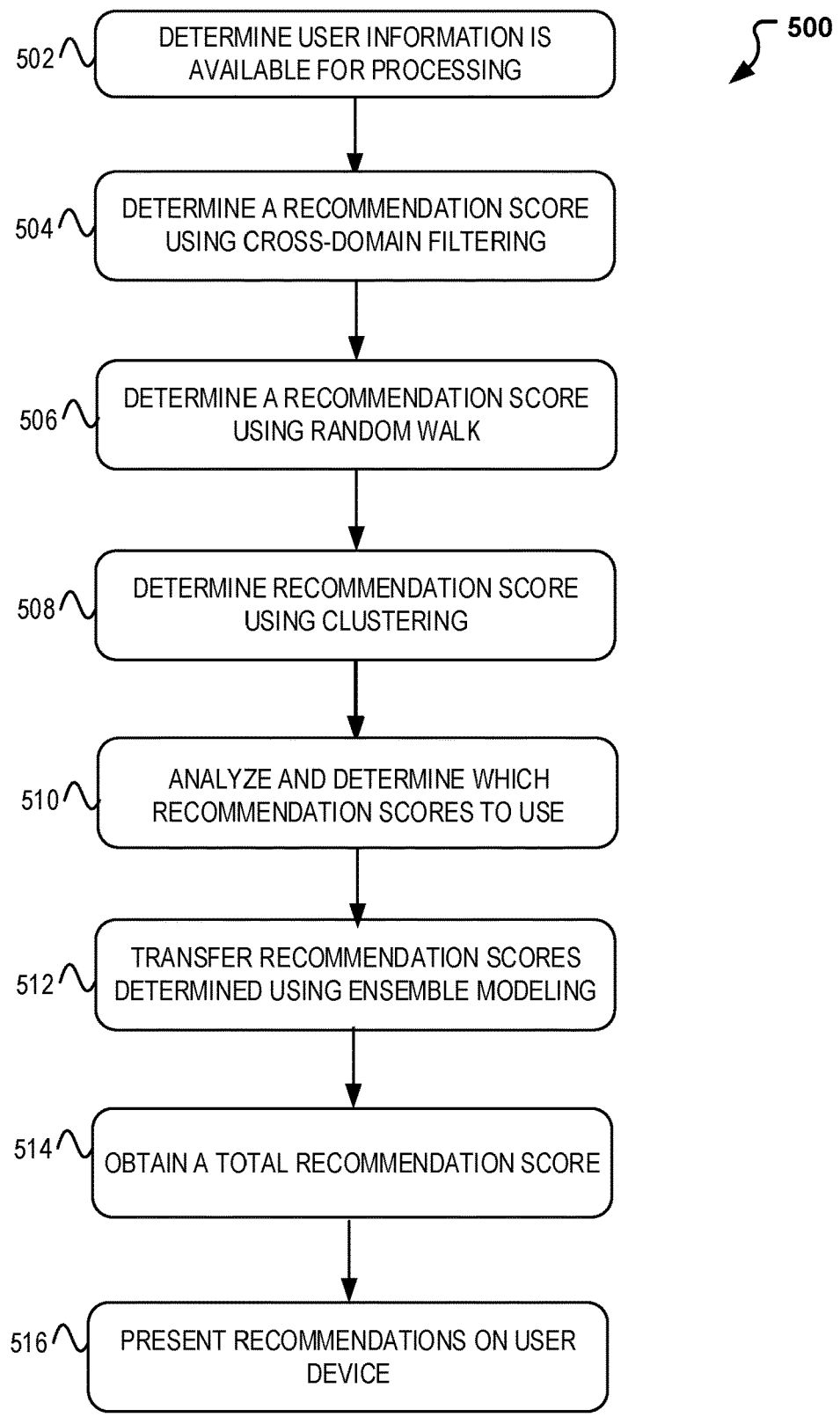
FIG. 5 illustrates a flow diagram illustrating operations for determining recommendations using cross-collaborative filtering.

Turning to FIG. 5, an example process 500 for obtaining a recommendation score implemented by a system and method such as that presented above and in conjunction with FIG. 2 is presented. In particular, FIG. 5 illustrates a flow diagram illustrating operations for obtaining a recommendation score using cross-domain collaborative filtering is presented. According to some embodiments, process 500 may include one or more of operations 502-516, which may be implemented, at least in part, in the form of executable code stored on a non-transitory, tangible, machine readable media that, when run on one or more hardware processors, may cause a system to perform one or more of the operations 502-516.

Process 500 may begin with operation 502, where a system receives or determines that user information is available for processing. The user information can include a user profile, transactional information (including peer-to-peer transactions), charitable contributions, peer associations including but not limited to family, friends, contacts and the like. As indicated, the user information may be available at a system for processing and as an example can include a third-party service provider with access to user and transactional information.

Once the user information is available for transacting, process 500 can continue to operation 504 wherein a recommendation score may be computed. In particular, at operation 504, a recommendation score may be obtained using a cross domain filtering model. In the cross-domain filtering model, user may include making a recommendation based in part on an association or prediction regarding people who made a purchase with a particular merchant and also donated to a particular charity. In other words, the system is designed to show that users who make purchases at a particular merchant are also likely to make a donation to a specific cause.

Once the recommendation score is determined using the cross-domain filtering model at operation 504, another recommendation score may be determined using a random walk model at operation 506. As previously indicated, the random walk model may include a model that is focused more on transactions and peers associated with a user and may also use information regarding who the transactions or what peers the user transacted with. Thus, the random walk model can be generated using a mathematical path that can be generated between transactions across entities and/or with other peers to determine a recommendation score.

At operation 508, yet another recommendation score may be generated using a clustering model. The clustering model may be a model that uses a technique based on grouping objects or dividing a population based on similarities. For example, provided the users are members of a third-party payment provider service (e.g., PayPal) the users may be clustered based on profile data. Thus, in the charity example, a user may be presented with a customized charity or provided a recommendation score based on the cluster the user falls in. The users may therefore be classified into one of n clusters based on a profile data which can include information including but not limited to gender, address, age, marital status, etc. As such, the clustering model may be a model that users a user profile information to provide a recommendation score.

Note that is some embodiments, the determination of a recommendation score can include one or more of a combination of operation 504-508. That is to say, at operation 510 it may be determined that an input to the ensemble model may necessitate the recommendation score obtained from the model using cross-domain filtering. In another embodiment, operation 510 may determine that an input to the ensemble model may necessitate the recommendation score from the model using random walk and/or a combination of the cross-domain filtering model at operation 504 and random walk model at operation 506. Still in another embodiment, operation 510 may determine that the input to the ensemble model may necessitate the recommendation score from the model using the clustering and/or the clustering model at operation 508 and the random walk model at operation 506 and/or the clustering model at operation 508 and cross-domain filtering model at operation 504, and/or a combination of all recommendation scores from the models at operations 504-506. Additionally, an operation for determining which of the one or more models to use in the computation of the recommendation score may occur and exist prior to the determination of the recommendation score using the cross-domain filtering model at operation 504.

Continuing with process 500, at operation 510 an analyzing may be used to determine which recommendation score obtained from operations 504-508 may be used to determine a total recommendation score and/or recommendation on a user device. As indicated above, this determination may occur as an earlier operation and used for obtained a more accurate recommendation. In the analysis, user information available, transactions, prior contributions and donations, peer associations and the like may be considered to determine which one or more of the recommendations to use.

Once the recommendations scores to use are determined, process 500 continues to operation 512 wherein those designated recommendation scores are transferred to and used by the ensemble model. As indicated, the ensemble model may be a model which uses two or more analytical models (e.g., random walk and cross-domain) to obtain a final result or recommendation. The final result or recommendation may be obtained by combining a prediction made by each of the models in order to obtain or generate a more accurate final result. Alternatively, the ensemble model may obtain the final result by selecting and using the one or more models which create a best model for the problem considered. The final or total recommendation score may be obtained at operation 514 and presented to a user at operation 516.

Note that although process 500 is described to include the computation a three recommendation scores, more or less recommendation scores and/or models may be used. Additionally, the order of the models and analysis of the recommendation scores may occur in a varying order and process 500 is presented herein for exemplary purposes. Further, the recommendation may be presented to a user on a mobile device, smart phone, laptop, desktop, or other device available to present the recommendation. Details on such device are described below and in conjunction with FIG. 7.

Figure 6:
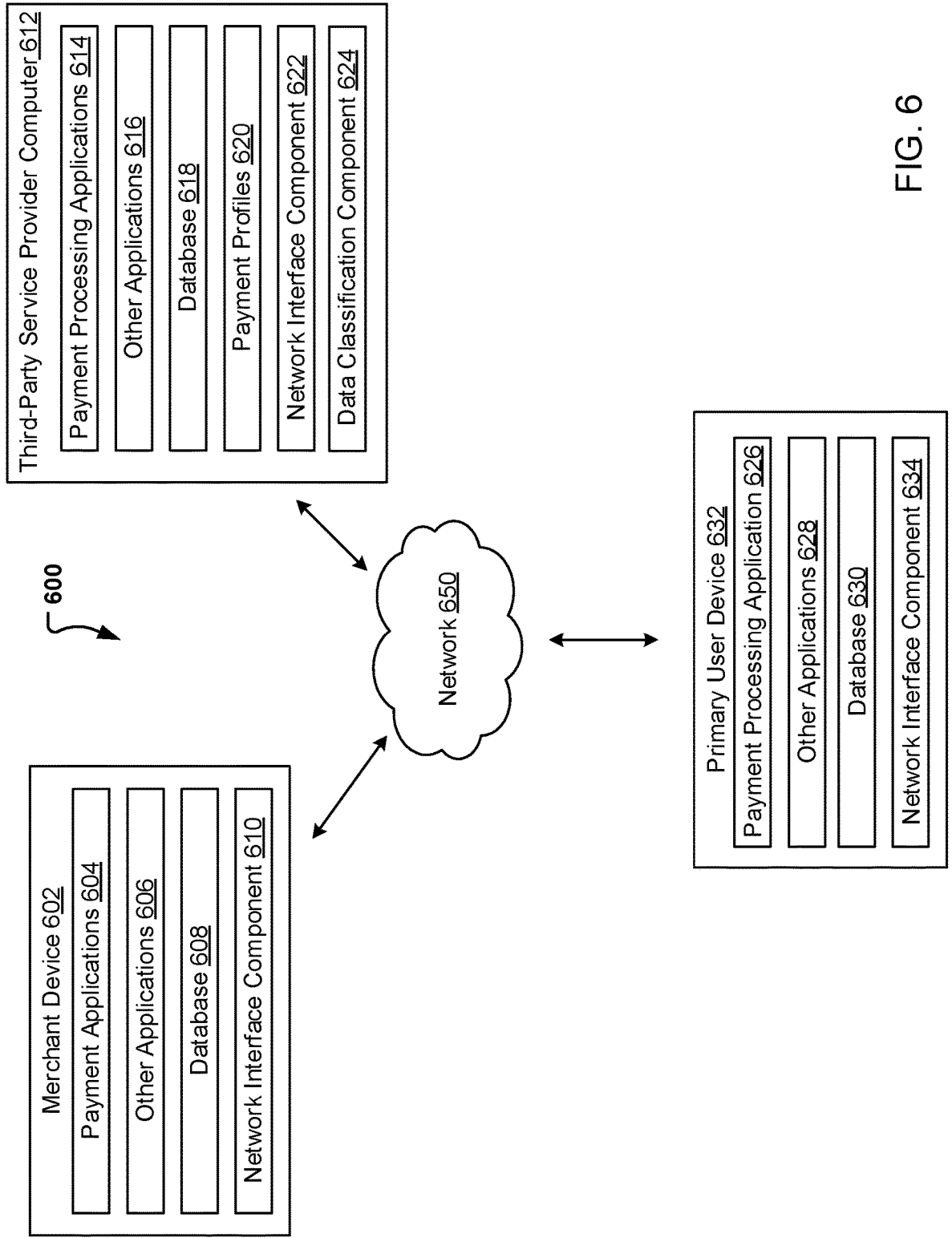
FIG. 6 illustrates a block diagram of a system for determining recommendations using cross-domain filtering.

FIG. 6 is a block diagram of a networked system 600 for implementing the processes described herein, according to an embodiment. In particular, FIG. 6 illustrates a block diagram of a system 600 for proving recommendations using cross domain filtering. As shown, system 600 may include or implement a plurality of devices, computers, servers, and/or software components that operate to perform various methodologies in accordance with the described embodiments. It will be appreciated that the devices, computers, and/or servers illustrated in FIG. 6 may be deployed differently and that the operations performed, and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 600 includes a merchant/charity device 602, a primary user device 632, a third-party service provider computer 612 in communication over a network 650. These devices 602, 632, and 612 are exemplary devices that may interact during a transaction that may result in a charitable contribution.

The merchant device 602, primary user device 632, and the third-party service provider computer 612 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 600, and/or accessible over network 650.

The merchant device 602 may be implemented as a communication device that may utilize appropriate hardware and software configured for wired and/or wireless communication with the primary user device 632 and third-party service provider computer 612. For example, the merchant device 602 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, servers, and/or other types of computing devices capable of transmitting and/or receiving data. The merchant device 602 may correspond to and be utilized by a user, such as an employee of a merchant and/or another person authorized by the merchant, or independently as a stand-alone system.

The merchant device 602 may include one or more payment applications 604, other applications 606, a database 608, and a network interface component 610. The payment applications 604 and other applications 606 may correspond to executable processes, procedures, and/or applications with associated hardware. In other embodiments, merchant device 602 may include additional or different components having specialized hardware and/or software to perform operations associated with the payment applications 604 and/or the other applications 606.

The payment application 604 may facilitate financial transactions corresponding to the sale of goods and/or services offered by the merchant. For example, the payment application 604 may provide an interface for customers to purchase the goods or services, make a contribution, and to receive customer payment information (e.g., customer credit card information). The payment application 604 may further transmit customer payment information to a payment processor (e.g., such as a payment processor corresponding to the third-party service provider computer 612) to process the customer payment information. The payment application 604 may also facilitate other types of financial transactions such as banking, online payments, money transfer, donations, and/or the like.

The merchant device 602 may execute the other applications 606 to perform various other tasks and/or operations corresponding to the merchant device 602. For example, the other applications 606 may include security applications for implementing client-side security features, programmatic client applications for interfacing with appropriate application programming interfaces (APIs) over network 650, or other types of applications. In various embodiments, the other applications 606 may include social networking applications. Additionally, the other applications 606 may include device interfaces and other display modules that may receive input and/or output information. For example, the other applications 606 may include a graphical user interface (GUI) configured to provide an interface to the user. As an example, the graphical user interface may include a selectable button designed to provide a donation to a charitable cause and/or other applications 606 may be associated with a charitable cause designed for making contributions or donations.

The merchant device 602 may further include a database 608, which may be stored in a memory and/or other storage device of the merchant device 602. The database 608 may include, for example, identifiers (IDs) such as operating system registry entries, cookies associated with the payment application 604 and/or other applications 606, IDs associated with hardware of the network interface component 610, IDs used for payment/user/device authentication or identification, and/or other appropriate IDs. The database 608 may also include information corresponding to one or purchase transactions of customers who have purchased goods or services from the merchant, browsing histories of the customers, or other types of customer information. In certain embodiments, the merchant device 602 may also include information corresponding to payment tokens, such as payment tokens generated by the third-party service provider computer 612.

The merchant device 602 may also include at least one network interface component 610 configured to communicate with various other devices such as the primary user device 132, and/or the third-party service provider computer 612. In various embodiments, network interface component 610 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like. Additionally, or alternatively, the merchant device 602 may include a charitable device designed to receive and transact with a user in making a donation.

The third-party service provider computer 612 may be maintained, for example, by a third-party service provider, which may provide payment processing services for the merchant. In one example, the third-party service provider may be provided by PAYPAL™ Inc. of San Jose, Calif., USA. Alternatively, the third-party service provider computer 612 may be associated with a user of the primary device 632. As such, the third-party service provider computer 612 includes one or more payment processing applications 614, which may be configured to process payment information received from the merchant device 602 or from a selection at the primary user device 632. For example, the payment application 604 of the merchant device 602 may receive payment information from a customer to purchase a service or good offered by the merchant. Upon receipt of the payment information, the payment application 604 may transmit the payment information to the third-party service provider computer 612. The payment processing application 614 of the third-party service provider computer 612 may receive and process the payment information. As another example, the payment application 604 can present a payment code on a display of the user device associated with the merchant. The payment code can be scanned or transmitted to the merchant device 602 for payment processing. Still as another example, the payment processing application can present a successful transaction notification on the display of the user device when the application has been authorized and ready for post-processing.

The third-party service provider computer 612 may execute the other applications 616 to perform various other tasks and/or operations corresponding to the third-party service provider computer 612. For example, the other applications 616 may include security applications for implementing client-side security features, programmatic client applications for interfacing with appropriate APIs over the network 650, or other types of applications. The other applications 616 may also include additional communication applications, such as email, texting, voice, and IM applications that enable communication of emails, calls, texts, and other notifications through the network 650. In various embodiments, the other applications 616 may include location detection applications, such as a mapping, compass, and/or GPS applications, which may be used to determine a location of the third-party service provider computer 612. Additionally, the other applications 616 may include device interfaces and other display modules that may receive input and/or output information. For example, the other applications 616 may include a GUI configured to provide an interface to one or more users.

The third-party service provider computer 612 may further include a database 618, which may be stored in a memory and/or other storage device of the third-party service provider computer 612. The database 618 may include, for example, IDs such as operating system registry entries, cookies associated with the payment processing application 614 and/or other the applications 616, IDs associated with hardware of the network interface component 622, IDs used for payment/user/device authentication or identification, transaction IDs, and/or other appropriate IDs.

According to a particular embodiment, the third-party service provider computer 612 may include a set of payment profiles 620 corresponding to past sales transactions executed by the merchant device 102 with respect to one or more customers of the merchant. Alternatively, the third-party service provider computer 612 may include a set of merchant payment profiles corresponding to the payment sources associated to a corresponding merchant. For example, a particular payment profile from the set of payment profiles 620 may include payment information corresponding to a particular customer of the merchant and/or a merchant associated with a user. The payment information may include credit card information (e.g., encrypted card number, expiration date, security code, card issuer, and/or the like), Automated Clearing House (ACH) information (e.g., encrypted account number, routing number, and/or the like), identification information associated with the particular customer/user (e.g., a customer identifier, name, address, phone number, date of birth, and/or the like), billing information, credit score, and/or any other type of payment information associated with the particular customer. Furthermore, other payment profiles of the set of payment profiles 620 may include payment information corresponding to other customers of the merchant and/or other merchants associated with the user. In addition, the third-party service provider computer 612 may store the set of payment profiles 620 according to a first file format.

Similarly, in another embodiment, the third-party service provider computer 612 may include a set of donations, contact profiles, user profile information, etc. which may be used in providing recommendations. The recommendations may be presented to a user of the primary user device 632 and identified in-part based on the profile information collected and stored.

The third-party service provider computer 612 may also store a set of payment tokens corresponding to the set of payment profiles 620. For example, each payment profile of the set of payment profiles 620 may be associated with a corresponding payment token from the set of payment tokens. In some embodiments, each payment profile may include a corresponding payment token from the set of payment tokens. The set of payment tokens may be particular to the third-party service provider computer 612 (e.g., computers from other service providers may be unable to use the set of payment tokens) and may enable the merchant device 602 to more securely process payment transactions with the third-party service provider computer 612. For example, in order to process a payment transaction that involves a credit card number associated with a particular payment profile, the third-party service provider computer 612 may provide the merchant device 602 with a particular payment token that is different from the credit card number. The merchant device 602 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 602.

In various embodiments, the third-party service provider computer 612 also includes at least one network interface component 622 that is configured to communicate with the merchant device 602 and/or the primary user device 632 via the network 650.

The third-party provider computer 612, may also include a data classification component 624 that may be used for raw data classification. In one embodiment, the raw data received by the third-party service provider computer 612 and/or stored in database 618 can be analyzed to identify errors in transaction post-processing, determine cross-domain correlations, determine user specific recommendations, determine a recommendation score, etc.

The primary user device 632 may be implemented as a communication device that may utilize appropriate hardware and software configured for wired and/or wireless communication with the merchant device 602 and third-party service provider computer 612. The primary user device 632, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 632 may be mobile device communicating with wearable device (or secondary user device), merchant device 602, or directly with the third-party service provider system 612.

The primary user device 632 may include a payment processing application 626 that may be used as a digital wallet that can communicate with a merchant device 602, a secondary user device, and/or third-party service provider 612 for purchasing and transacting. The payment processing application 626, can work jointly with database 630 for retrieving bank account information, user accounts, security codes, tokens that may be associated with various merchant locations, charities, and other relevant causes. Similarly, the payment processing application, can also provide access the user profiles for determining which payment method, processing code, and/or recommendation to make and use.

The primary user device 632 may also include other applications 628 to perform various other tasks and/or operations corresponding to the primary user device 632. For example, the other applications 628 may facilitate communication with the merchant device 602, such as to receive an indication, from the merchant device 602, to switch payment processing services from the third-party service provider to the service provider. As another example, the other applications 628 may include security applications, application that enable designation of a primary interactive device, and applications that allow for web site searches (including access to merchant websites). The other applications 628 may also include additional communication applications, such as email, texting, voice, and IM applications that enable communication of emails, calls, texts, and other notifications through the network 650. In various embodiments, the other applications 628 may include location detection applications, such as a mapping, compass, and/or GPS applications, which may be used to determine a location of the primary user device 632. The other applications 628 may include social networking applications. Additionally, the other applications 628 may include device interfaces and other display modules that may receive input and/or output information. For example, the other applications 628 may include a GUI configured to provide an interface to one or more users.

The primary user device 632 may further include a database 630, which may be stored in a memory and/or other storage device of the primary user device 632. The database 630 may include, for example, identifiers (IDs) such as operating system registry entries, cookies associated with a web browser and/or the other applications 628, IDs associated with hardware of the network interface component 634, IDs used for payment/user/device authentication or identification, bank information, merchant information, user accounts, and/or other appropriate IDs.

The primary user device 632 may also include at least one network interface component 634 configured to communicate with various other devices such as the merchant device 602 and/or the third-party service provider computer 612.

Figure 7:
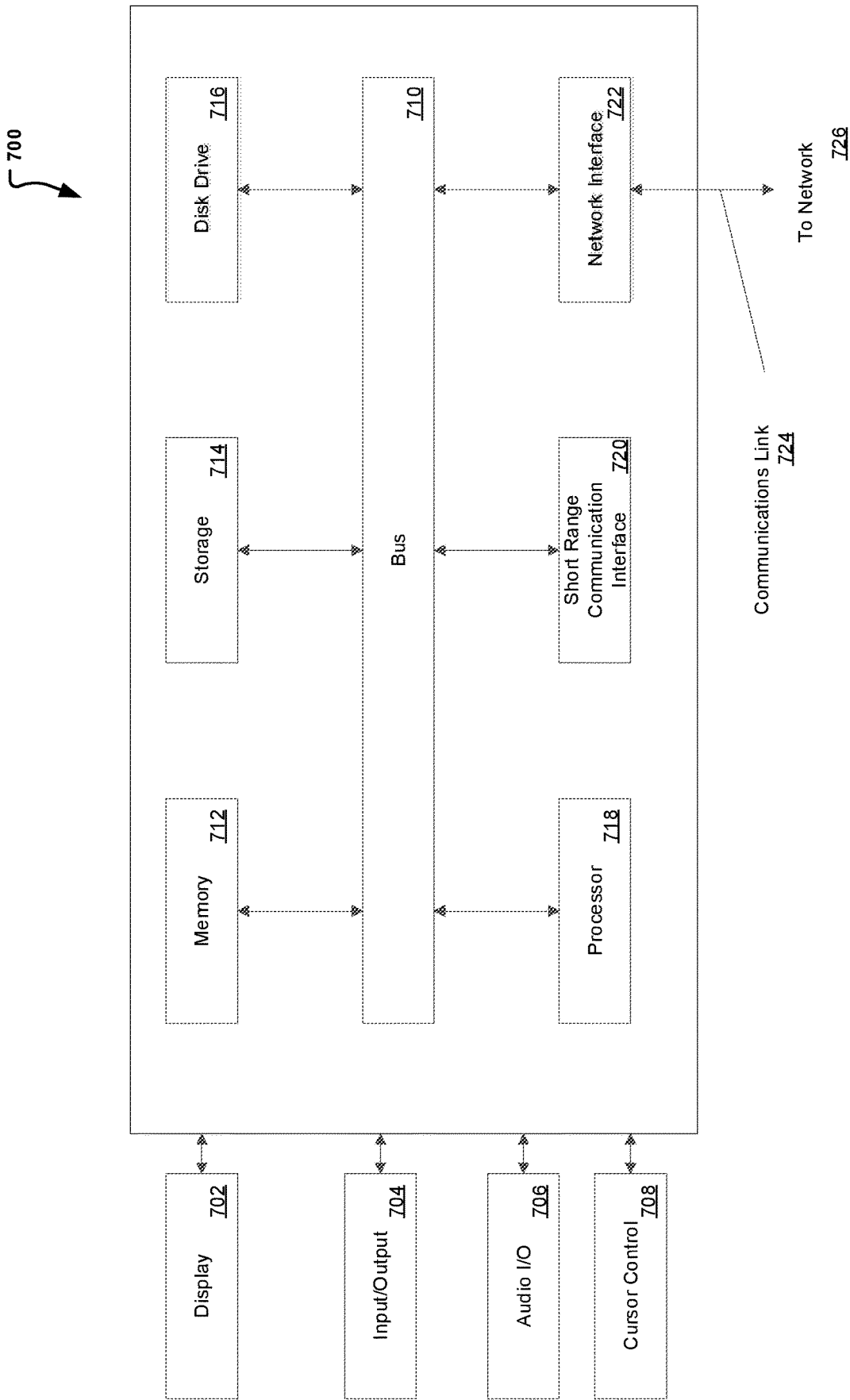
FIG. 7 illustrates an example block diagram of a computer system suitable for implementing one or more devices of the communication systems of FIGS. 1-6.

FIG. 7 illustrates an example computer system 700 in block diagram format suitable for implementing on one or more devices of the system in FIG. 1. In various implementations, a device that includes computer system 700 may comprise a computing device (e.g., a smart or mobile device, a computing tablet, a personal computer, laptop, wearable device, PDA, server, etc.) that is capable of communicating with a network 726. A service provider and/or a content provider may utilize a network computing device (e.g., a network server or third-party service provider computer 612) capable of communicating with the network 726. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 704 may also include an output component, such as a display 702 and a cursor control 708 (such as a keyboard, keypad, mouse, touchscreen, etc.). In some examples, I/O component 704 may include an image sensor for capturing images and/or video, such as a complementary metal oxide semiconductor (CMOS) image sensor, and/or the like. An audio input/output component 706 may also be included to allow a user to use voice for inputting information by converting audio signals. Audio I/O component 706 may allow the user to hear audio. A transceiver or network interface 722 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 718, which may be a micro-controller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712. Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short-range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WIFI, Bluetooth®, Bluetooth Low Energy (BLE), infrared, NFC, etc.).

Short range communications interface 720, in various embodiments, may be configured to detect other devices (e.g., primary user device 632, merchant device 602, etc.) with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short-range communications protocol, such as Wi-Fi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants/vendors and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions;
a processor configured to execute the instructions to cause the system to:
receive, via a network from a merchant device, payment information for a transaction between a user and a merchant associated with the merchant device, based on an interaction by the user with a payment application associated with the merchant;
retrieve, from a database, user information for the user and cross-domain information for the merchant and other entities associated with a service provider;
determine, using a specific algorithm-based model with a first part of the user information retrieved from the database, a first recommendation score representing a first correlation between the user and the other entities;
determine, using a cross-domain collaborative filtering model with a second part of the user information and the cross-domain information retrieved from the database, a second recommendation score representing a second correlation between the user and the other entities;
apply the first and second recommendation scores as inputs to train an ensemble machine learning model to determine correlations between the user information and the cross-domain information using at least one of the specific algorithm-based model or the cross-domain collaborative filtering model;
determine, using the trained ensemble machine learning model, a total recommendation score; and
present, via a graphical user interface of the payment application, a recommendation for a possible transaction between the user and at least one of the other entities, based on the total recommendation score.

2. The system of claim 1, wherein the specific algorithm-based model is a random walk model, and the first recommendation score is obtained using at least one of the random walk model or a clustering model.

3. The system of claim 2, wherein the random walk model uses a combination of user profile information and peer-to-peer transactions from the user information to determine the first recommendation score.

4. The system of claim 2, wherein the clustering model uses profile information from the user information retrieved to determine the first recommendation score.

5. The system of claim 1, wherein the second recommendation score is obtained using a combination of the specific algorithm-based model and the cross-domain collaborative filtering model.

6. The system of claim 1, wherein the cross-domain collaborative filtering model uses a combination of the user information and the cross-domain information to determine the second recommendation score.

7. The system of claim 1, wherein the ensemble machine learning model includes a decision tree model and uses one or more of the first and second recommendation scores to obtain the total recommendation score.

8. The system of claim 1, wherein a total recommendation score is obtained using the ensemble machine learning model and a combination of the first recommendation score determined using the specific algorithm-based model, the second recommendation score determined using the cross-domain collaborative filtering model, and a third recommendation score determined using a clustering model.

9. A method, comprising:
receiving, via a network from a merchant device, payment information for a transaction between a user and a merchant associated with the merchant device, based on an interaction by the user with a payment application associated with the merchant;
retrieving, from a database, user information for the user and cross-domain information for the merchant and other entities associated with a service provider;
determining, using a specific algorithm-based model with a first part of the user information retrieved from the database, a first recommendation score representing a first correlation between the user and the other entities;
determining, using a cross-domain collaborative filtering model with a second part of the user information and the cross-domain information retrieved from the database, a second recommendation score representing a second correlation between the user and the other entities;
applying the first and second recommendation scores as inputs to train an ensemble machine learning model to determine correlations between the user information and the cross-domain information using at least one of the specific algorithm-based model or the cross-domain collaborative filtering model;
determining, using the trained ensemble machine learning model, a total recommendation score; and
presenting, via a graphical user interface of the payment application, a recommendation for a possible transaction between the user and at least one of the other entities, based on the total recommendation score.

10. The method of claim 9, wherein the specific algorithm-based model is a random walk model, and the first recommendation score is obtained using at least one of the random walk model or a clustering model.

11. The method of claim 10, wherein the random walk model uses a combination of user profile information and peer-to-peer transactions from the user information to determine the first recommendation score.

12. The method of claim 10, wherein the clustering model uses profile information from the user information retrieved to determine the first recommendation score.

13. The method of claim 9, wherein the second recommendation score is obtained using a combination of the specific algorithm-based model and the cross-domain collaborative filtering model.

14. The method of claim 9, wherein the cross-domain collaborative filtering model uses a combination of the user information and the cross-domain information to determine the second recommendation score.

15. The method of claim 9, wherein the ensemble machine learning model includes a decision tree model and uses one or more of the first and second recommendation scores to obtain the total recommendation score.

16. The method of claim 9, wherein a total recommendation score is obtained using the ensemble machine learning model and a combination of the first recommendation score determined using the specific algorithm-based model, the second recommendation score determined using the cross-domain collaborative filtering model, and a third recommendation score determined using a clustering model.

17. A non-transitory machine-readable medium having instructions stored thereon, the instructions executable to cause performance of operations comprising:
receiving, via a network from a merchant device, payment information for a transaction between a user and a merchant associated with the merchant device, based on an interaction by the user with a payment application associated with the merchant;
retrieving, from a database, user information for the user and cross-domain information for the merchant and other entities associated with a service provider;
determining, using a specific algorithm-based model with a first part of the user information retrieved from the database, a first recommendation score representing a first correlation between the user and the other entities;
determining, using a cross-domain collaborative filtering model with a second part of the user information and the cross-domain information retrieved from the database, a second recommendation score representing a second correlation between the user and the other entities;
applying the first and second recommendation scores as inputs to train an ensemble machine learning model to determine correlations between the user information and the cross-domain information using at least one of the specific algorithm-based model or the cross-domain collaborative filtering model;
determining, using the trained ensemble machine learning model, a total recommendation score; and
presenting, via a graphical user interface of the payment application, a recommendation for a possible transaction between the user and at least one of the other entities, based on the total recommendation score.

18. The non-transitory machine-readable medium of claim 17, wherein the specific algorithm-based model is a random walk model, and the first recommendation score is obtained using at least one of the random walk model or a clustering model.

19. The non-transitory machine-readable medium of claim 18, wherein the random walk model uses a combination of user profile information and peer-to-peer transactions from the user information to determine the first recommendation score.

20. The non-transitory machine-readable medium of claim 17, wherein a total recommendation score is obtained using the ensemble machine learning model and a combination of the first recommendation score, the second recommendation score, and a third recommendation score determined using a clustering model.

* * * * *